United States Patent
Salguero et al.

(10) Patent No.: US 8,114,544 B1
(45) Date of Patent: Feb. 14, 2012

(54) METHODS AND APPARATUS FOR INCREASING BIOFILM FORMATION AND POWER OUTPUT IN MICROBIAL FUEL CELLS

(75) Inventors: Tina T. Salguero, West Hills, CA (US); Jocelyn Hicks-Garner, Venice, CA (US); Souren Soukiazian, Burbank, CA (US)

(73) Assignee: HRL Laboratories, LLC, Malibu, CA (US)

( * ) Notice: Subject to any disclaimer, the term of this patent is extended or adjusted under 35 U.S.C. 154(b) by 480 days.

(21) Appl. No.: 12/386,087

(22) Filed: Apr. 13, 2009

(51) Int. Cl.
  *H01M 8/16* (2006.01)
  *H01M 4/13* (2010.01)
(52) U.S. Cl. .................................. 429/401; 429/231.8
(58) Field of Classification Search .................. 429/401, 429/231.8
  See application file for complete search history.

(56) References Cited

U.S. PATENT DOCUMENTS

| | | | |
|---|---|---|---|
| 7,160,637 B2 | 1/2007 | Chiao et al. | |
| 7,382,959 B1 * | 6/2008 | Jacobsen | 385/129 |
| 2006/0147763 A1 | 7/2006 | Angenent et al. | |
| 2007/0048577 A1 | 3/2007 | Ringeisen et al. | |
| 2007/0249044 A1 | 10/2007 | Tejal et al. | |
| 2007/0259217 A1 * | 11/2007 | Logan | 429/2 |
| 2008/0220292 A1 * | 9/2008 | Rabaey et al. | 429/2 |

FOREIGN PATENT DOCUMENTS

| | | | |
|---|---|---|---|
| EP | 1 742 288 A1 | | 1/2007 |
| EP | 1742288 | * | 1/2007 |
| WO | WO 2007/027730 A2 | | 3/2007 |

OTHER PUBLICATIONS

Jacobsen et al. (Adv. Mater. 2007, 19, 3892-3896).*

* cited by examiner

*Primary Examiner* — Yogendra Gupta
*Assistant Examiner* — Jeremiah Smith
(74) *Attorney, Agent, or Firm* — Christie, Parker, Hale

(57) ABSTRACT

A method and an apparatus is provided for increasing biofilm formation and power output in microbial fuel cells. An anode material in a microbial fuel cell has a three-dimensional and ordered structure. The anode material fills an entire anode compartment, and it is arranged to allow fluid flow within the anode compartment. The power output of microbial fuel cells is enhanced, primarily by increasing the formation and viability of electrogenic biofilms on the anodes of the microbial fuel cells. The anode material in a microbial fuel cell allows for the growth of a microbial biofilm to its natural thickness. In the instance of members of the Geobacteraceae family, the biofilm is able grow to a depth of about 40 microns.

6 Claims, 16 Drawing Sheets
(10 of 16 Drawing Sheet(s) Filed in Color)

| Anode Material | Inoculum | |
| --- | --- | --- |
| | *Geobacter sulfurreducens* | Mixed Culture (Tapia wastewater) |
| Carbon Cloth — peak power | 0.20 mW | 0.80 mW |
| Carbon Cloth — time to peak power | 54 days | 200 days |
| Carbon Foam — peak power | 0.17 mW | 0.04 mW |
| Carbon Foam — time to peak power | 38 days | 29 days |
| Carbon Microtruss — peak power | 0.22 mW | 0.84 mW |
| Carbon Microtruss — time to peak power | 19 days | 93 days |

FIG. 12

METHODS AND APPARATUS FOR INCREASING BIOFILM FORMATION AND POWER OUTPUT IN MICROBIAL FUEL CELLS

BACKGROUND

1. Field of the Invention

The present invention relates generally to fuel cells, and more particularly, the present invention relates to microbial fuel cells (MFCs).

2. Description of Related Art

Clean and efficient energy production from renewable resources is highly desirable due to the concurrent rapid increases in both energy demand and environmental concerns. Of particular interest are MFCs in which microorganisms act as biotransformation mechanisms, consuming oxidizable organic material containing chemical energy and producing useful energy in the form of electricity. Further, MFCs with enhanced power output have vast potential commercial applications. In general, MFCs are especially well suited for long term (months, years) and/or remote applications where refueling/recharging is not an option. However, the development of MFCs is in its infancy, and there is great potential to increase power output through electrochemical, microbiological, and systems engineering improvements.

The general definition of a fuel cell is a device that converts chemical energy to electrical energy. In the specific case of MFCs, the electrical energy is produced by microorganisms that metabolize organic materials. Microbes that are capable of such transformations are termed "electrogenic," which refers to creating a net flow of charge. Electrons produced by the bacteria are transferred to an anode and then through an electrical circuit to a cathode.

Microorganisms are the power source within the MFC. In a mediator-less MFC, electrons produced by the metabolic activity of the microorganisms are transferred out of the microorganism to an electrically-conducting electrode. Microorganisms that are not in electrical contact with the electrode surface directly or via the electrically-conductive biofilm usually do not have access to an acceptor for the electrons generated, and as a result, these cells will not proliferate.

Current research in the area of MFCs has resulted in development of various MFC arrangements. However, such MFCs are generally unsatisfactory, producing low power density and low efficiency of conversion of a microbial nutrient fuel to useful energy, such that MFCs have so far been limited in production and application.

One strategy to increase MFC power output is to optimize the surface area and porosity of the anode material. It is advantageous to tailor these properties because electrical current correlates with both available surface area and density of electrogenic microorganisms. Increasing the surface area of the electrode can have a dramatic effect on the power output. For example, a fuel cell that contains a 10 cm$^3$ three-dimensional electrode with a surface area of 100 cm$^2$/cm$^3$ has a theoretical power output one hundred times greater than one containing a 10 cm$^2$ two-dimensional electrode (e.g., graphite rod, carbon cloth).

The porosity of the electrode material is also important because the structure must allow for the circulation of biological media (containing water, food/fuel, trace nutrients, etc.) to the entire microbial population. Electrogenic bacteria, such as *Geobacter sulfurreducens* and *Geobacter metallireducens*, are typically 1 micron in width and 1-2 microns in length, depending on the particular species. There must be room within the electrode structure for a biofilm to grow, as well as for fluid to move within the structure and allow fuel to diffuse into the structure and waste to diffuse away from the biofilm. If fuel and waste cannot be transported throughout the biofilm, the current production in different areas will vary and some cells will not be viable. For example, a biofilm of wild type *Geobacter sulfurreducens* or *Geobacter metallireducens* can generally grow to a depth of approximately 40 microns. Usage of microbes from other families of bacteria or microbes will provide biofilms of varying depth. Accordingly, the structural dimension of the structure should account for and allow for the depth of the biofilm on its surface.

The following related art all utilize three-dimensional anode materials, but these materials are irregularly sized and shaped, which prevents the optimum growth and performance of electrogenic biofilms.

US patent publication 20070259217 "Materials and Configurations for Scalable Microbial Fuel Cells." This patent publication discloses the utilization of a carbon fiber brush anode.

EP1742288(A1) [also EP1902489 (A2)] "Microbial fuel cells for oxidation of electron donors." This patent discloses tubular, mushroom-shaped, and omega-shaped MFCs filled with conductive particles, namely graphite granules.

US patent publication 20060147763 (A1) "Upflow Microbial Fuel Cell." This patent publication discloses a cylindrical anode chamber filled with granular activated carbon.

US patent publication 20070048577 (A1) (also WO2007027730) "Scalable Microbial Fuel Cell with Fluidic and Stacking Capabilities." This patent publication discloses a three-dimensional anode composed of RVC foam, for example. However, the RVC foam is not made to fill the entire anode compartment, nor is a fluid flow-through scheme utilized.

Therefore, a need exists for increasing the power density of microbial fuel cells. Once the power output of these fuel cells become competitive with other energy technologies, they will be attractive replacements for batteries, for example, in certain application niches. MFCs have the additional advantages of fuel flexibility, being self-regenerating, operating at mild conditions, having high coulombic efficiency, being environmentally benign and intrinsically non-polluting, being robust to fuel interruption, being robust to mixed/impure fuel sources, having no thermal/acoustic signature, and potentially being inexpensive (e.g., unlimited supply of microbes). Each embodiment of the present invention provides a solution to meet such need.

SUMMARY OF THE INVENTION

Aspects of embodiments of the present invention are directed toward microbial fuel cells (MFCs).

An embodiment of the invention provides methods to increase the power output of MFCs, primarily by increasing the formation and viability of electrogenic biofilms on the anodes of the MFCs.

Another embodiment of the present invention is directed to an anode material in a MFC that is a three-dimensional and ordered structure. An exemplary example of the present invention is an anode material that fills the entire electrode compartment for the purpose of guiding the biological media through the anode material in such a way as to optimize the growth and performance of electrogenic biofilms.

An embodiment of the present invention is an anode material in a MFC that is an electron-conducting microstructure. A further embodiment is an anode material comprised of a microtruss architecture. One example is a microstructure made from carbon.

An embodiment of the present invention is an anode material in a MFC that allows for the growth of a microbial biofilm to its natural thickness. In the instance when the biofilm is comprised of members of the Geobacteraceae family, the biofilm would grow to a depth of about 40 microns. An additional embodiment is an anode material that has sufficient length and space to accommodate the growth of a biofilm given the particular constituent microbes present.

An exemplary embodiment of the present invention has an anode material that exhibits a low resistance (compared to anode material made from RVC foam) in a MFC thereby increasing power output. The resistance would be about less than 25 Ohms. An alternative embodiment has resistance at about 20 Ohms or less. In another exemplary embodiment, the resistance is about 15 Ohms or less.

An embodiment of the invention is a MFC that increases the formation and viability of electrogenic biofilms by having an anode material that is a three-dimensional, ordered microstructure in an anode compartment, a cathode in a cathode compartment, a cation exchange membrane disposed between the anode and the cathode, and a plurality of microbes forming a biofilm on the anode. A further embodiment has the microstructure filling the entire anode compartment. In another exemplary embodiment, the microstructure is electron-conducting. Another embodiment can be made from carbon, and it can be in the form of a microtruss. An additional embodiment of the invention is a microstructure that permits the growth of a biofilm to its natural thickness in media. An additional embodiment is a MFC configured to allow optimal fluid flow through the material. Sufficient internal space within the anode material is necessary to permit optimal fluid flow. The microbes of an embodiment are electrogenic. The electrogenic microbes can belong to the family Geobacteraceae, as well as other microbial families. An embodiment of the invention are microbes that metabolize nutrients for generating electricity to the anode material. An embodiment is an anode chamber that is configured in such a manner so that the fluid (biological media) is forced to flow through an anode material, thus reaching the entire microbial population within.

An embodiment of the method for increasing the power output in a MFC uses an anode material having a three-dimensional, ordered structure in an anode compartment. A further embodiment of the method has a structure that fills the entire compartment. An additional embodiment is the structure made from carbon microtruss. The dimension of the anode material would accommodate the growth of a microbial biofilm to its natural thickness and would permit fluid flow within its space.

More specifically, an embodiment of the present invention provides an anode material in a microbial fuel cell having an electrode compartment. Here, the anode material includes a microbial biofilm grown on a three-dimensional ordered open-cellular microstructure.

In one embodiment, the anode material fills the entire electrode compartment.

In one embodiment, the three-dimensional ordered open-cellular microstructure is an electron-conducting microstructure. The three-dimensional ordered open-cellular microstructure may be a three-dimensional ordered open-cellular carbon microstructure and may include a plurality of microtrusses.

In one embodiment, the three-dimensional ordered open-cellular microstructure includes a plurality of first truss elements defined by a plurality of first self-propagating polymer waveguides and extending along a first direction, a plurality of second truss elements defined by a plurality of second self-propagating polymer waveguides and extending along a second direction, and a plurality of third truss elements defined by a plurality of third self-propagating polymer waveguides and extending along a third direction. Here, the first, second, and third ordered truss elements interpenetrate each other at a plurality of nodes to form a continuous material.

In one embodiment, the three-dimensional ordered open-cellular microstructure has a dimension that allows for growth of the microbial biofilm to its natural thickness, and the three-dimensional ordered open-cellular microstructure permits fluid flow within its internal space.

In one embodiment, the three-dimensional ordered open-cellular microstructure has a electrical resistance less than about 25 Ohms.

Another embodiment of the present invention provides a microbial fuel cell. The microbial fuel cell includes an anode material, an anode compartment, a cathode material, a cathode compartment, and a cation exchange membrane. The anode material includes a microbial biofilm grown on a three-dimensional ordered open-cellular microstructure. The anode compartment houses the anode material. The cathode compartment houses the cathode material, and the cation exchange membrane is between the anode material and the cathode material. Here, microbes of the microbial biofilm metabolize nutrients to generate electricity of the anode material.

In one embodiment, the microbes are electrogenic. The microbes may be from the family of Geobacteraceae.

In one embodiment, the three-dimensional ordered open-cellular microstructure is configured such that its mass transport properties does not limit power output of the microbial fuel cell.

Another embodiment of the present invention provides a method of increasing the power output in a microbial fuel cell having an anode compartment. The method includes the steps of: forming a three-dimensional ordered open-cellular microstructure; forming a three-dimensional ordered anode material by growing a microbial biofilm on the three-dimensional ordered open-cellular microstructure; and arranging the three-dimensional ordered anode material in the anode compartment such that a fluid flows through the anode compartment.

In one embodiment, the step of arranging the three-dimensional ordered anode material in the anode compartment includes the step of filling the anode material within the entire anode compartment.

In one embodiment, the step of forming the three-dimensional ordered open-cellular microstructure includes the step of assembling the three-dimensional ordered open-cellular microstructure from a plurality of carbon microtrusses.

In one embodiment, the step of forming the three-dimensional ordered open-cellular microstructure include the step of providing an internal space within the three-dimensional ordered open-cellular microstructure for allowing the microbial biofilm to grow to a natural thickness of the microbial biofilm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

FIG. 12 shows a table comparing the power output between several MFCs using different anode materials.

DETAILED DESCRIPTION

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

An embodiment of the invention is an anode material that is a three-dimensional ordered open-cellular microstructure, which allows optimum fluid flow through the material. That is, in the context of embodiments of the present invention, a three-dimensional ordered open-cellular microstructure is referred to as an ordered three-dimensional structure at the micrometer scale. The anode material has the three-dimensional ordered open-cellular microstructure with an appropriate length and dimension to accommodate about 40 microns thick biofilms when they are microbes from the family of Geobacteraceae. Biofilms composed from other microbes will have varying thickness, and the dimension of the anode material should take such variation in size into consideration. Moreover, an embodiment of the present invention exhibits an unexpected result of lower resistance compared with the resistance of related materials such as RVC foam. An exemplary embodiment of the invention is an anode material that is three-dimensional and completely fills the anode chamber, which leads to increased energy density. A further embodiment of the present invention has the anode chamber configured in such a manner as to allow fluids (e.g., biological media) to flow through the anode material, thus reaching the entire microbial population within.

An embodiment of the invention describes a new electrode concept that combines the advantageous properties of high surface area with three dimensional structure and periodic porosity. Referring now to FIGS. 1a, 1b, 2a, and 2b, the anode material of an exemplary embodiment is a novel carbon microtruss material, as disclosed in U.S. patent application Ser. No. 11/870,379, filed Oct. 10, 2007, entitled "Ordered Open-Cellular Carbon Microstructures And Method Of Making Same," the entire content of which is incorporated herein by reference. In addition, fabrications of polymer versions of the as well as conversion into carbon, metallic and ceramic versions are described in U.S. Pat. No. 7,382,959, entitled "Optically Oriented Three-Dimensional Polymer Microstructures," the entire content of which is incorporated herein by reference; in U.S. patent application Ser. No. 11/870,379, entitled "Ordered Open-Cellular Carbon Microstructures And Method Of Making Same," the entire content of which is incorporated herein by reference; and in U.S. patent application Ser. No. 12/074,727, entitled "Ceramic Microtruss," the entire content of which is incorporated herein by reference.

Figure 1A:
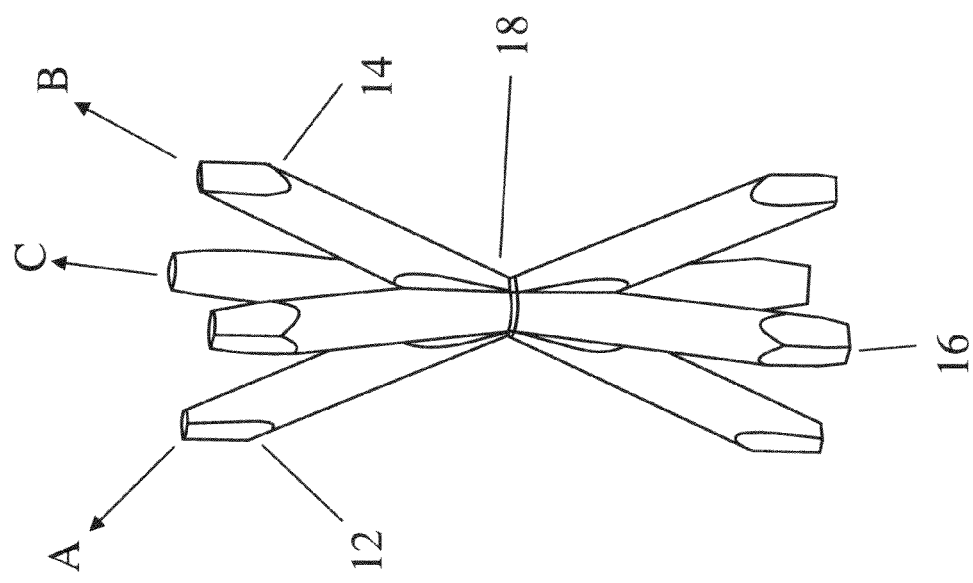
FIGS. 1a and 1b show diagrams of a three-dimensional ordered open-cellular carbon microstructure utilized to form a microtruss anode material according to an embodiment of the present invention.
Figure 1A:
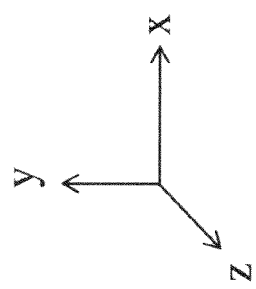
Figure 1B:
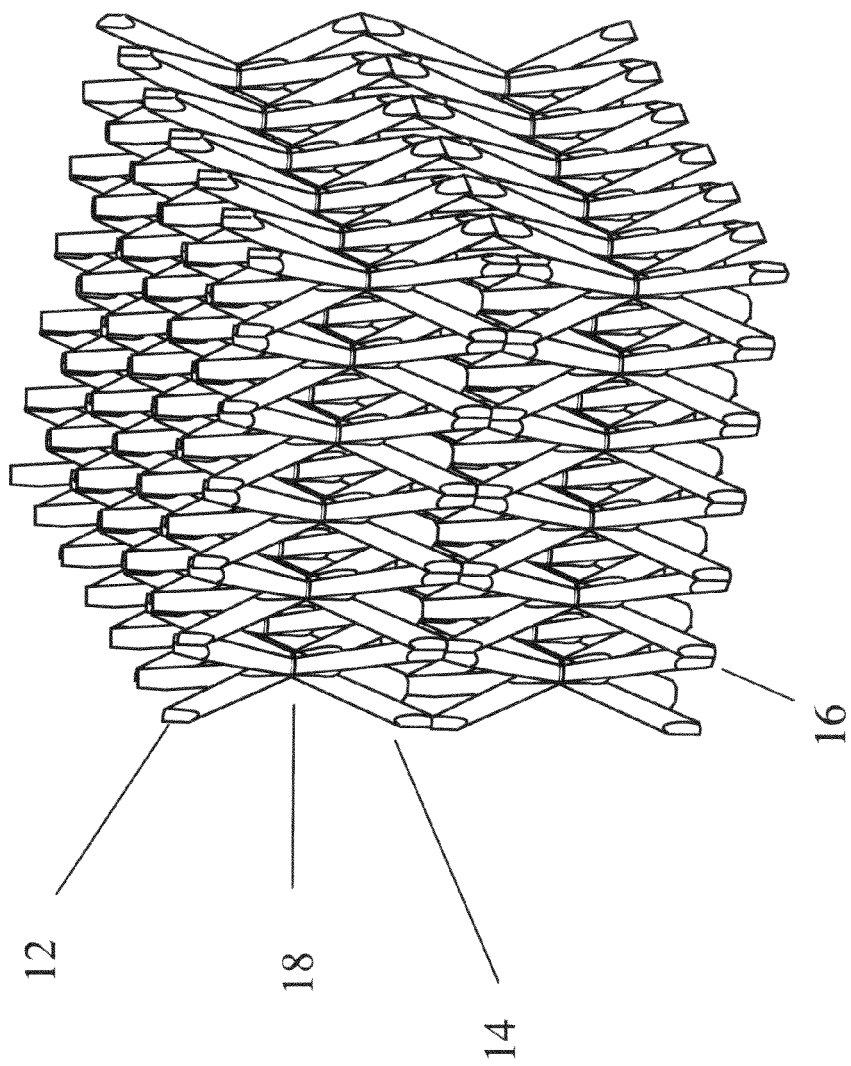

Referring to FIGS. 1a and 1b, a three-dimensional ordered open-cellular carbon microstructure 10 according to an embodiment of the present invention is a self-supporting structure. Here, in the context of embodiments of the present invention, a three-dimensional ordered open-cellular microstructure is referred to as an ordered three-dimensional structure at the micrometer scale. Referring to FIGS. 1a and 1b, the carbon microstructure 10 includes first carbonized truss elements 12, second carbonized truss elements 14, and third carbonized truss elements 16. The first carbonized truss elements 12 are defined by first self-propagating polymer waveguides and extend along a first direction A. The second carbonized truss elements 14 are defined by second self-propagating polymer waveguides and extend along a second direction B. The third carbonized truss elements 16 are defined by third self-propagating polymer waveguides and extend along a third direction C. With reference to FIGS. 1a, 1b, 2a and 2b, the carbonized truss elements 12, 14, 16 interpenetrate each other at nodes 18 to form a continuous material with a three-dimensional microstructure order and having a plurality of three-dimensional ordered pores (or spaces) defined by (or between) the carbonized truss elements 12, 14, 16 and the nodes 18.

In one embodiment, the carbonized truss elements 12, 14, 16 is formed initially by a photo-polymer material that is later carbonized. In one embodiment, the carbonized truss elements 12, 14, 16 are polymer optical waveguide truss elements described in U.S. Pat. No. 7,382,959 that have been carbonized.

In one embodiment, the continuous material is continuously formed such that it lacks any interior boundaries, e.g., boundaries within the interpenetrating portions of truss elements 12, 14, 16. In another embodiment, each node 18 of the carbon microstructure 10 is formed of the continuous material.

According to one embodiment of the present invention, the microstructure 10 is formed by using a fixed light input (collimated UV light) to cure (polymerize) polymer optical waveguides, which can self-propagate in a 3D pattern. As such, the propagated polymer optical waveguides a form a three-dimensional ordered open-cellular polymer microstructure that is carbonized into the carbon microstructure 10 as disclosed in U.S. patent application Ser. No. 11/870,379.

As disclosed in Monro et al. "Topical Review Catching Light In Its Own Trap," Journal Of Modern Optics, 2001, Vol. 48, No. 2, 191-238, which is incorporated by reference herein in its entirety, some liquid polymers, referred to as photopolymers, undergo a refractive index change during the polymerization process. The refractive index change can lead to a formation of polymer optical waveguides. If a monomer that is photo-sensitive is exposed to light (typically UV) under the right conditions, the initial area of polymerization, such as a small circular area, will "trap" the light and guide it to the tip of the polymerized region, further advancing that polymerized region. This process will continue, leading to the formation of a waveguide structure with approximately the same cross-sectional dimensions along its entire length.

According to one embodiment of the present invention, a mask with a two-dimensional pattern of apertures (see FIG. 3) is used to create a three-dimensional polymer microstructure (or an open-cellular polymer micro-truss structure).

Figure 3:
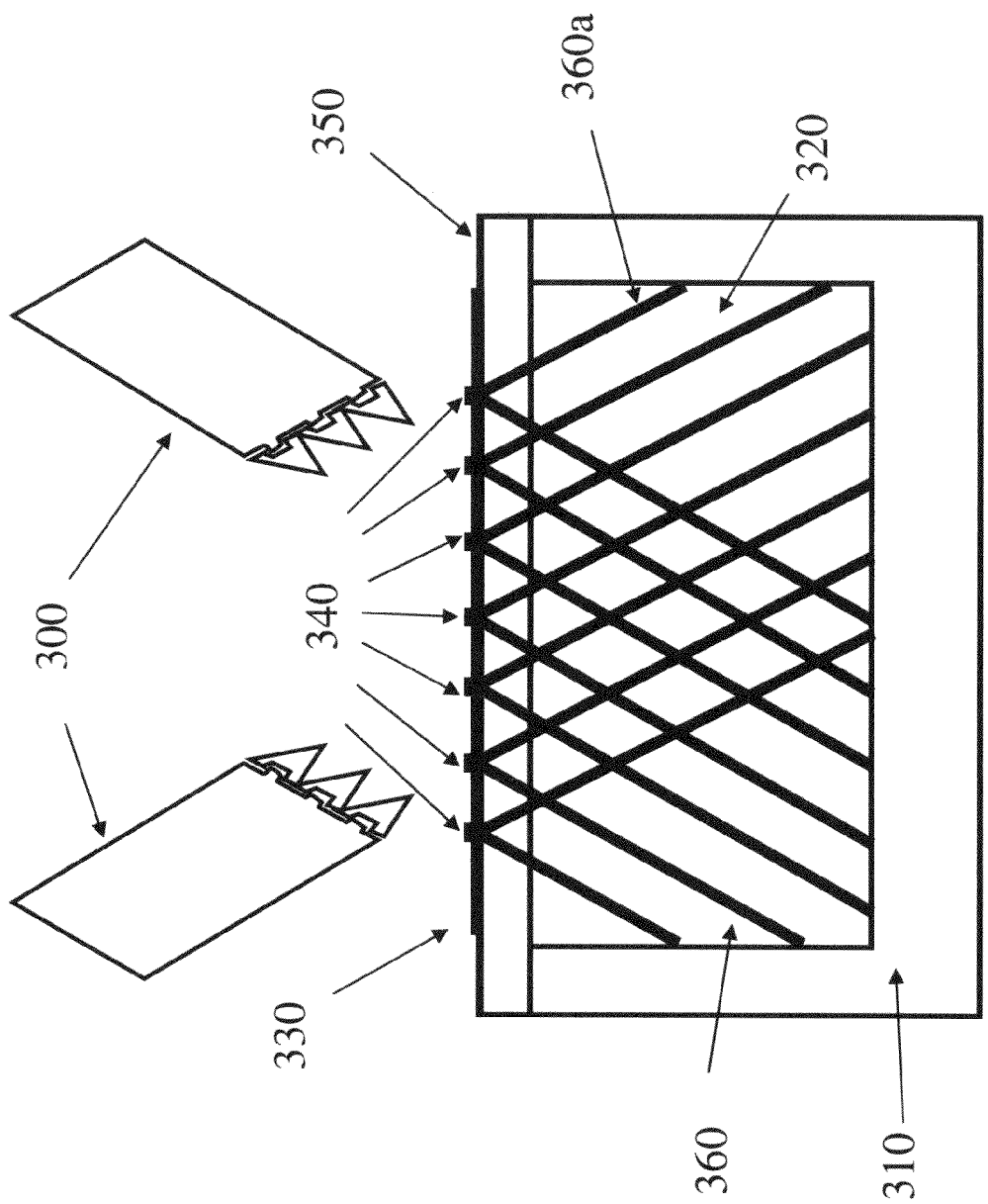
FIG. 3 is a schematic diagram of a system for forming a structure of an embodiment of the present invention from multiple waveguides created using a single collimated beam or multiple collimated beams through multiple apertures.
Figure 4B:
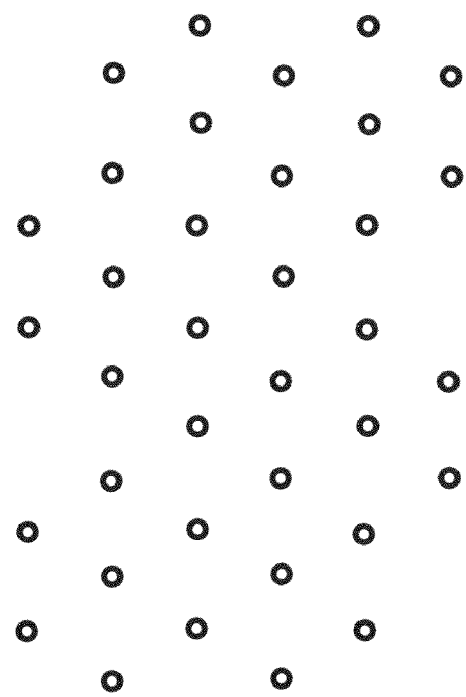
FIG. 4b illustrates an example of a hexagonal mask pattern (or a hexagonal mask aperture pattern) according to embodiments of the present invention.
Figure 4A:
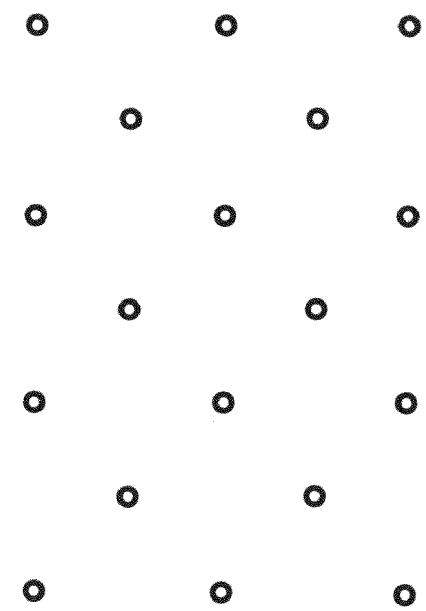
FIG. 4a illustrates an example of a square mask pattern (or a square mask aperture pattern) according to embodiments of the present invention.

With reference to FIG. 3, a system for forming a three-dimensional polymer microstructure according to an embodiment of the present invention includes one or more collimated light sources 300, a reservoir (mold) 310 having a volume of monomer 320 that will polymerize at a wavelength of collimated light beams provided by the light sources 300, and a patterning apparatus, such as a mask 330 with multiple apertures (open areas) 340. Each of the apertures 340 has a given shape and dimension substantially matching a cross-section geometry of a waveguide (e.g., waveguide 360a). Between the mask 330 and the monomer 320, there may be a substrate 350. Here, in FIG. 3, a truly 3D network can be formed because the intersecting polymer waveguides 360 will simply polymerize together, but will not interfere with waveguide propagation. Also, the spacing between the plurality of waveguides 360 corresponds with the pattern of the plurality of apertures 340. The pattern of the apertures 340 may, for example, be in a square pattern as shown in FIG. 4a and/or in a hexagonal pattern as shown in FIG. 4b. The hole (aperture) spacing, i.e., distance between apertures 340 in the mask 330, and the number of waveguides 360 formed from each of the apertures 340 will determine the open volume fraction (i.e. open space) of the formed three-dimensional ordered microstructure (or the formed open-cellular polymer micro-truss structure).

As such, through the system of FIG. 3, a three-dimensional ordered microstructure of an embodiment of the present invention can be designed for a given application. The design parameters include: 1) the angle and pattern of the waveguides with respect to one another, 2) the relative density of the resulting cellular structure (or the open volume fraction), and 3) the cross-sectional shape and dimensions of the waveguides.

With reference back to FIGS. 1a, 1b, 2a and 2b, the carbonized truss elements 12, 14, 16 of the carbon microstructure 10 define an open volume (i.e. free space) of the carbon microstructure 10. In one embodiment, the carbon microstructure 10 defines a free space of not less than about 40% by volume and not greater than about 99% by volume. In another embodiment, the carbon microstructure 10 defines a free space of not less than about 70% by volume and not greater than about 95% by volume.

The carbonized truss elements 12, 14, 16 intersect at the nodes 18 to form symmetrical angles in three dimensions (three orthogonal directions). The symmetrical angles relative to the xz-plane (see, FIG. 1), can measure between 0° and 90°. That is, the carbonized truss elements 12, 14, 16 interpenetrate each other to form "perfect" nodes: each of the carbonized truss elements 12, 14, 16 defines an angle relative to a compression surface of the carbon microstructure 10 (e.g. a surface extending along a direction of the xz-plane), and the respective angles defined by the truss elements 12, 14, 16 are substantially equal to one another. However, embodiments of the present invention are not limited thereto. The carbonized truss elements 12, 14, 16 have an intrinsically high strength due to their small scale. In one embodiment, each of the carbonized truss elements 12, 14, 16 has a diameter of between 10 μm and 2 mm. In another embodiment, each of the truss elements 12, 14, 16 has a diameter of not greater than about 500 μm.

In one embodiment, the carbonized truss elements 12, 14, 16 interpenetrating each other at nodes 18 of the carbon microstructure 10 have a three-dimensional order that is on a size scale (i.e., distance from one node to another node) between 30 μm and 5 mm. In another embodiment, the carbonized truss elements 12, 14, 16 interpenetrating each other at nodes 18 of the carbon microstructure 10 have a three-dimensional order that is on a size scale (i.e., distance from one node to another node) between 30 μm and 1 mm.

At certain size scales or diameters (e.g., the size scales or diameters described above), the strength of the truss elements is increased, which corresponds to an increased strength of the carbon microstructure 10. In one embodiment, each of the carbonized truss elements 12, 14, 16 has an alignment extending along an axial direction of the truss element. As such, an anisotropic material is produced, which provides a substantial degree of stiffness and/or strength along the axial direction.

Figure 5:
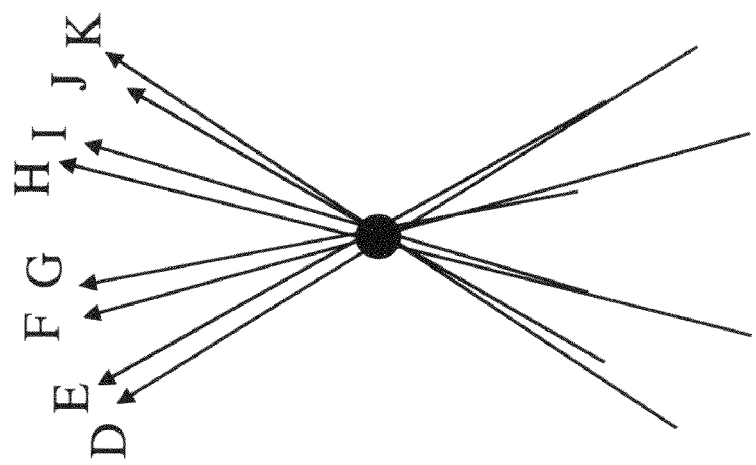
FIG. 5 is a perspective schematic view showing respective directions along which truss elements of a structure of an embodiment of the present invention extend.

In addition, the carbon microstructure 10 shown in FIGS. 1a and 1b includes truss elements 12, 14, 16 respectively extending along A, B, and C directions. However, embodiments of the present invention are not limited thereto. For example, with reference to FIG. 5, a structure of an embodiment of the present invention may include truss elements defined by self-propagating polymer waveguides and extending along D, E, F, G, H, I, J and K directions, respectively. For example, a structure according to an embodiment of the present invention may include eight truss elements, each of which extends along a corresponding one of eight varying directions. Here, similar to the embodiment shown in FIGS. 1a and 1b, the eight truss elements interpenetrate each to form nodes of a continuous material with a three-dimensional microstructure order. However, embodiments of the present invention are not limited thereto, and may include more or fewer than eight truss elements.

Figure 2B:
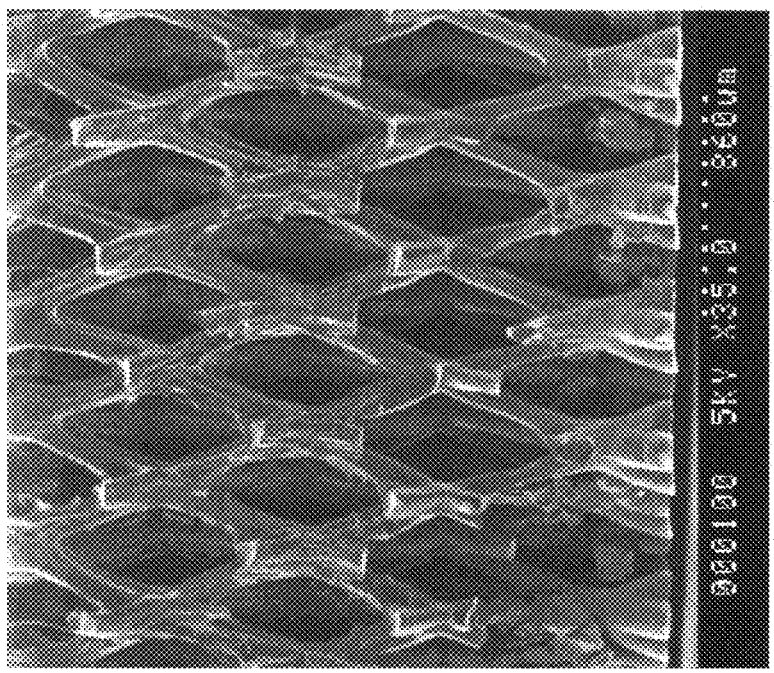
FIGS. 2a and 2b show images from a scanning electron microscope of a microtruss material.
Figure 2A:
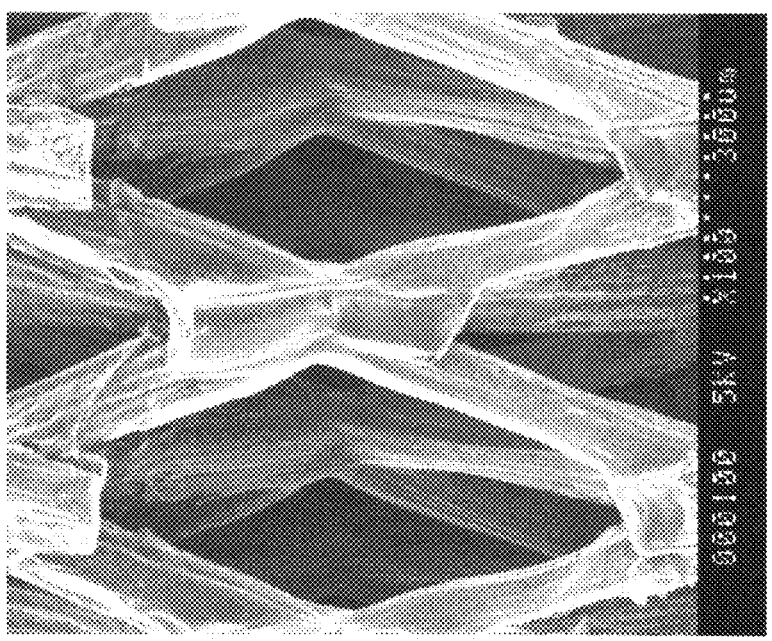

Scanninng electron micrographs of an exemplary ordered open-cellular three dimensional carbon microstructure according to an embodiment of the present invention are shown in FIGS. 2a and 2b. The ordered open cellular three dimensional carbon microstructure shown is electrically conductive and needs no metallic coating for scanning electron micrographs.

In one embodiment of the ordered open cellular carbon microstructure, the plurality of first carbonized truss elements, the plurality of second carbonized truss elements, and the plurality of third carbonized truss elements include a carbonized polyacrylonitrile (PAN) material.

In one embodiment of the ordered open-cellular carbon microstructure, the plurality of first carbonized truss elements, the plurality of second carbonized truss elements, and the plurality of third carbonized truss elements include a carbonized copolymer of polyurethane.

Figure 6:
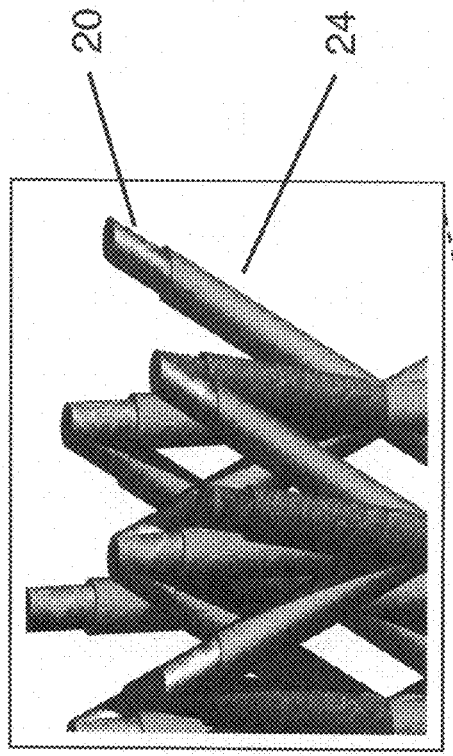
FIG. 6 shows a diagram of an exemplary embodiment of a biofilm-covered microtruss.
Figure 6:
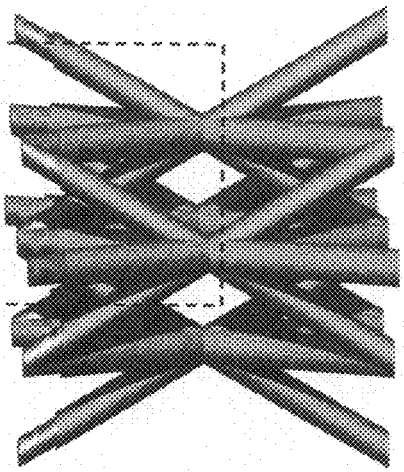

In FIG. 6, the microtruss provides a structural framework 20 for the growth of microbial biofilm 24 thereon. A microbial biofilm (or a biofilm) is a structured community of microbes adherent to a living or inert surface. In one exemplary embodiment, the material has a surface area of 50-100 $cm^2/cm^3$. The voids provide space for biofilms layers (typically about 40 micron (μm) thick for *Geobacter sulfurreducens*) on the microtruss surfaces, and the material's regular structure provides ample pathways for fuel and nutrient circulation.

Figure 7B:
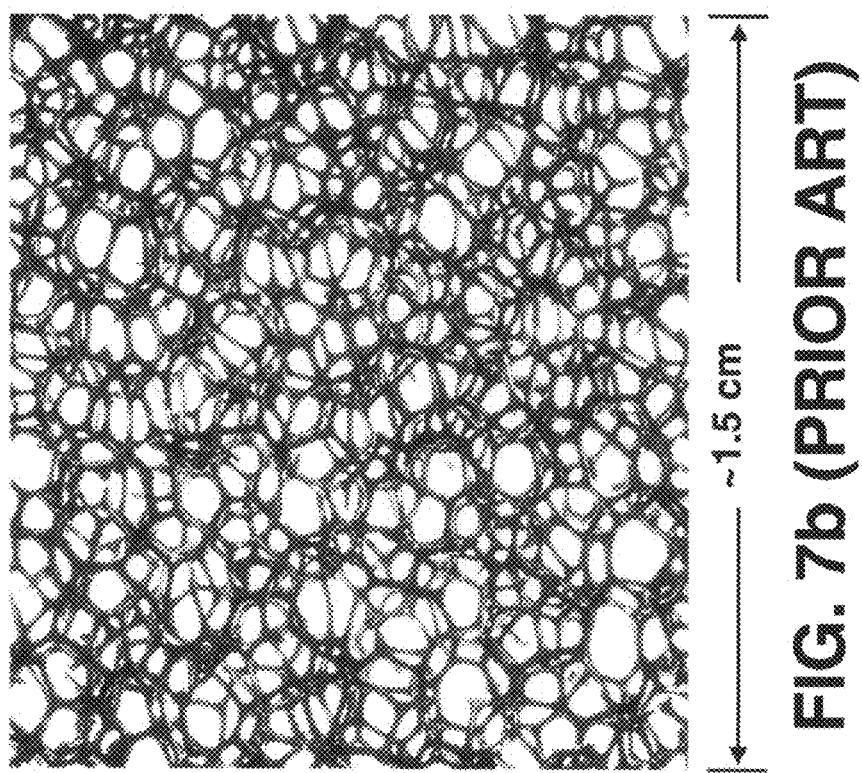
FIGS. 7a and 7b show images of a regular structure of a microtruss and with an irregular structure of a foam material, respectively.
Figure 7A:
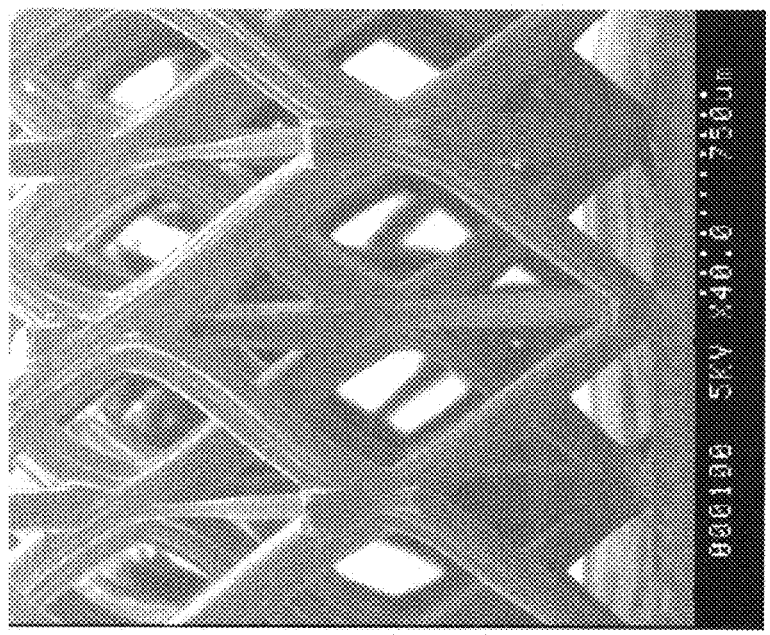

An embodiment of the invention provides a three dimensional structure with periodic porosity as seen in FIG. 7a, which is in contrast to prior art foam structures that have irregular porosity as in FIG. 7b.

Figure 8A:
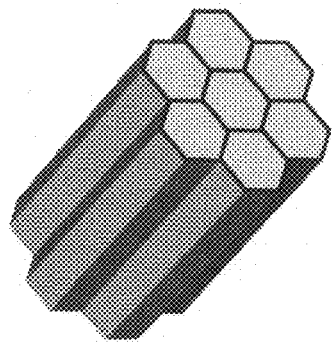
FIGS. 8a, 8b, 8c, 8d, and 8e show diagrams of other, exemplary embodiments of anode structures.
Figure 8B:
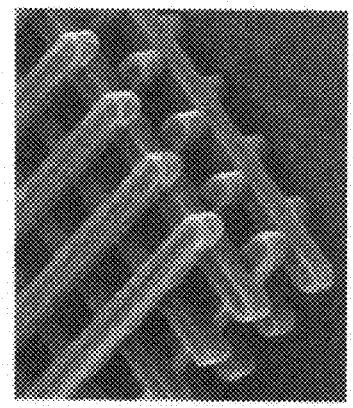
Figure 8C:
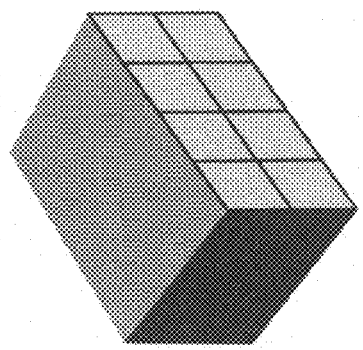
Figure 8D:
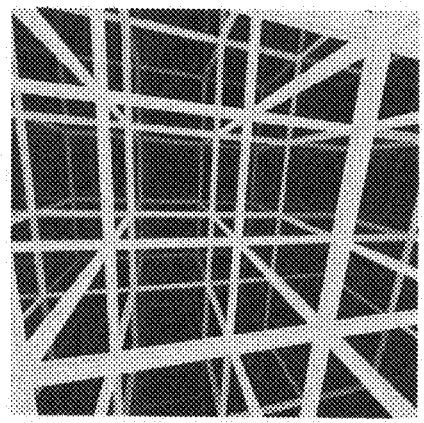
Figure 8E:
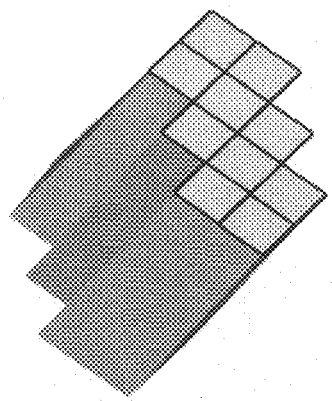

Referring to FIGS. 8a, 8b, 8c, 8d, and 8e, other embodiments of the invention have varying structural, geometric dimensions for the anode material that would support the growth of a biofilm. For example, FIG. 8a reveals a three dimensional honeycomb structure. FIG. 8b shows a three dimensional structure in an alternating beam structure. An alternative structure is a three-dimensional polygonal (e.g., square or rectangular) lattice as seen in FIGS. 8c and 8d. Another variation is a three dimensional diamond truss structure as seen in FIG. 8e. The drawings may be exaggerated to show details. Thus, the drawings are to be regarded as descriptive in nature and not restricted in their geometric and ordered shapes.

State-of-the-art electrode materials for microbial fuel cells typically include carbon cloth/paper/fibers or graphite rods/granules/felt/foam. Extensive research has demonstrated that electrogens (i.e., electrogenic microbes) will readily couple with and colonize conductive carbon anodes. Like RVC foam, the carbon microtruss material utilized in an embodiment of this invention is electrically conductive, durable, and structurally robust. However, in contrast to the carbon microtruss material, the flow of fluid/nutrient media through an open cell foam is impeded because of its irregular structure as shown in FIG. 7b. In addition, although the surface areas of foams are generally greater than that of the microtruss material, not all of the foam surface area is generally available for microbial colonization, partially due to the inefficient fluid flow preventing full media penetration in the anode chamber.

Figures 9A, 9B:
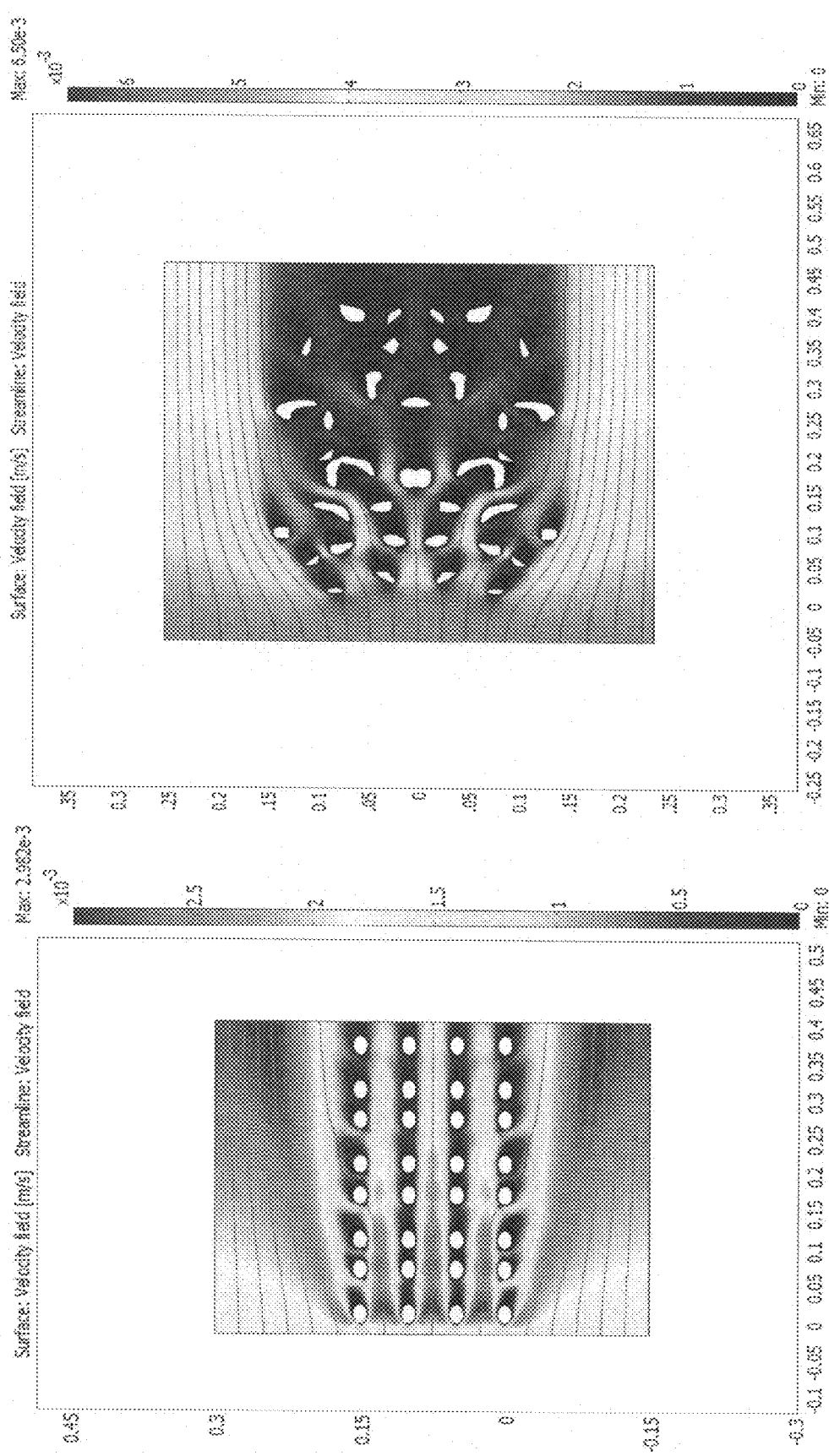
FIGS. 9a, 9b, 9c, and 9d show several images of fluid velocity magnitude for slides of a microtruss material and a random open-cell foam material in a larger fluid-filled compartment or in a compartment bound by walls.
Figure 9D:
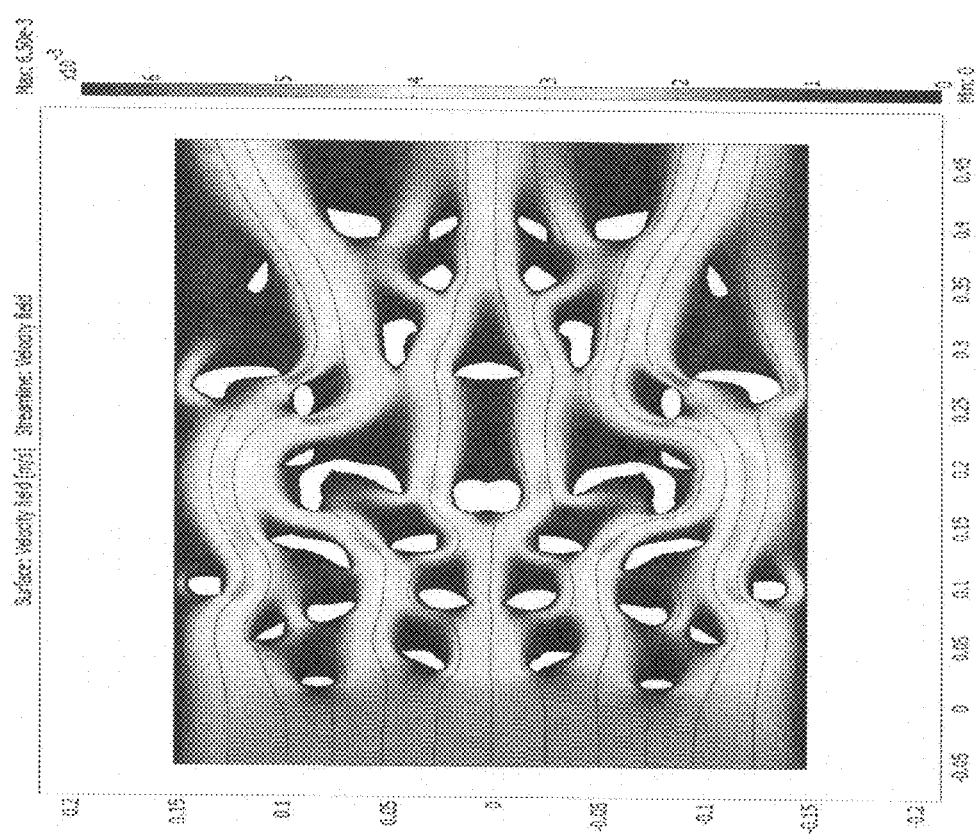
Figure 9C:
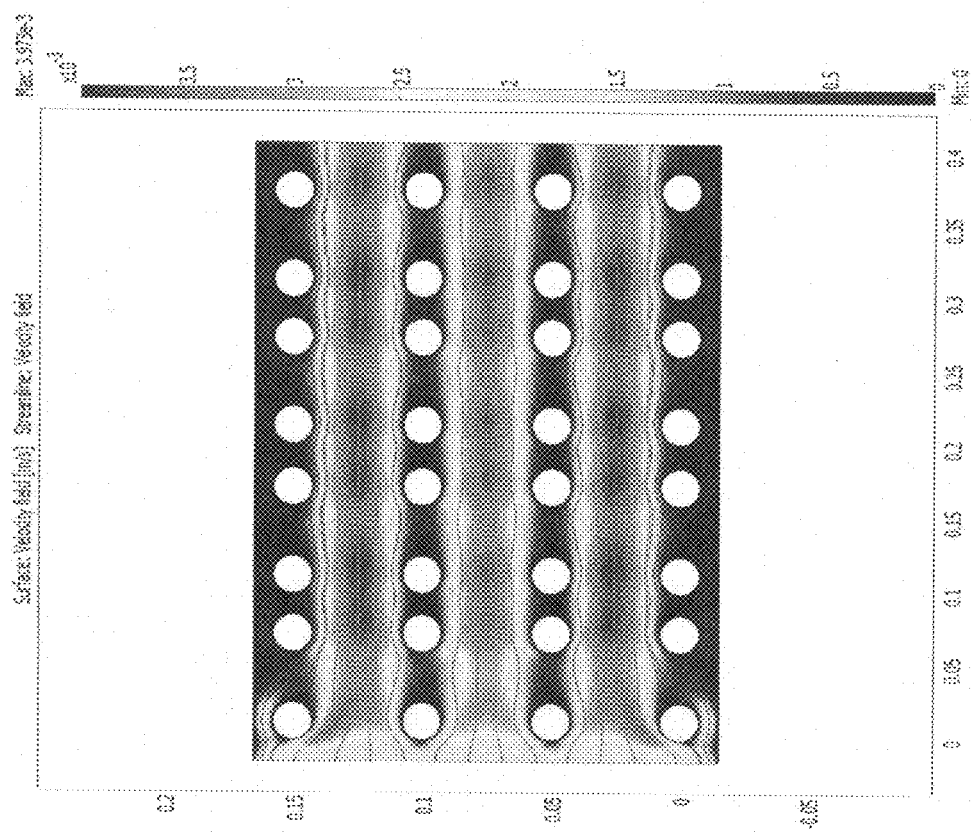

It is known in general that biofilm growth occurs preferentially in the path of fluid flow. By using computational fluid dynamics, the effects of electrode structure on biofilm growth can be illustrated. Two-dimensional, steady state fluid dynamics calculations have been performed using a commercial finite element analysis package. FIGS. 9a and 9c show the fluid velocity magnitude for slices of a microtruss material in a larger fluid-filled compartment and a microtruss material bounded by the walls of a fluid filled compartment, respectively. FIGS. 9b and 9d exhibit the fluid velocity magnitude for slices of a random open-cell foam material in a larger fluid-filled compartment and an open cell foam-type microstructure bound by the walls of a fluid-filled compartment. This planar approximation of the true 3-D flow demonstrates that fluid velocity is more uniform in the microtruss material when compared to open cell foam, and it is most uniform in the microtruss material bounded by the compartment walls (where the envelope volume of the anode material equals the volume of the anode compartment). In the open cell foam, the material randomness results in significant internal low flow areas, which will result in decreased biofilm growth and/or viability. In the microtruss model as seen in FIG. 9c, the regularity of the truss channels supports a conduit-type flow, easily allowing fresh media to reach the bulk of the surface of the biofilm-covered electrode. Comparing with FIGS. 9a and 9b, the fluid through an anode material in a larger fluid-filled compartment tends to flow around the material rather than through it.

Figure 10:
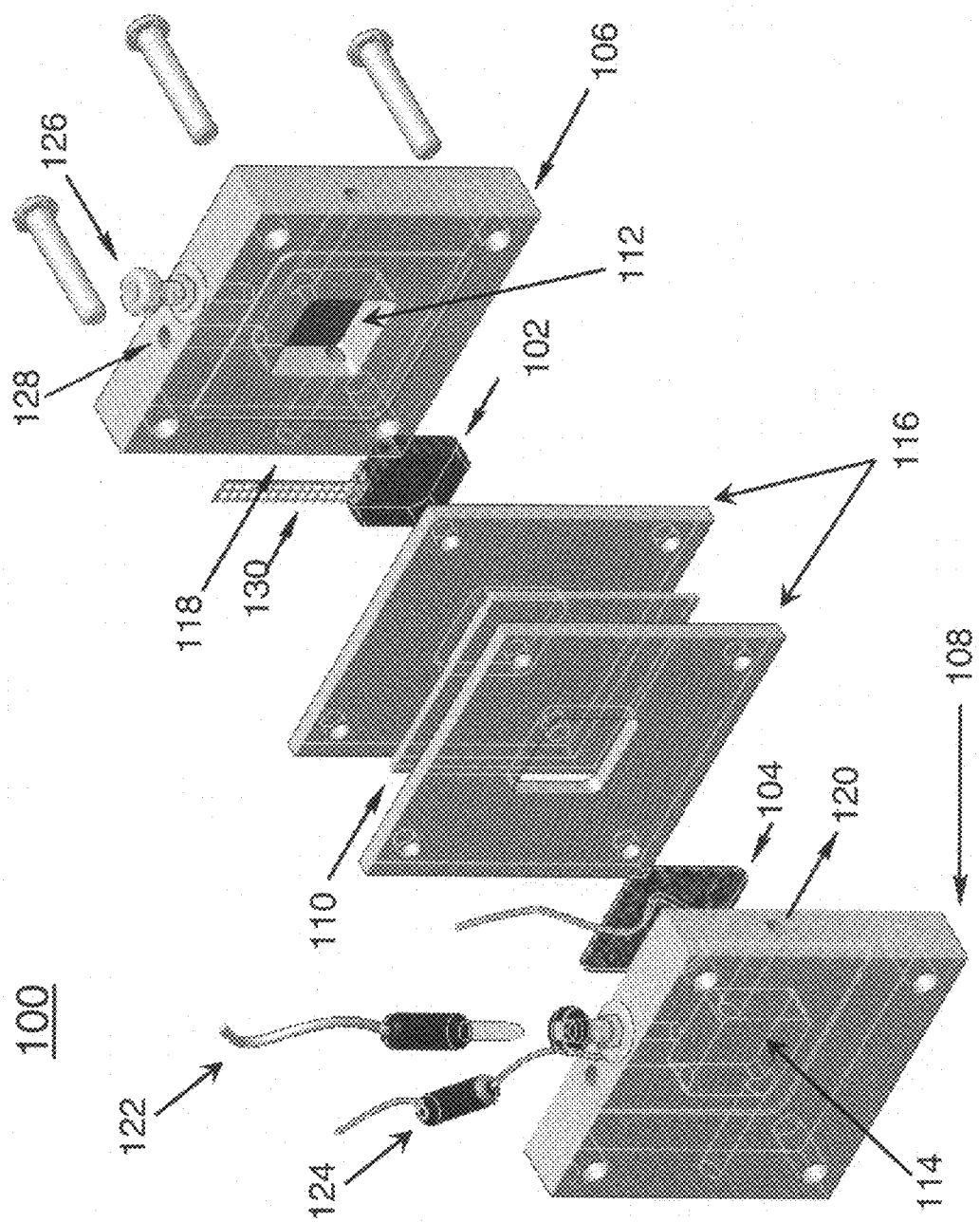
FIG. 10 shows a diagram of an exemplary embodiment of a fuel cell according to the present invention.

An exemplary embodiment of a fuel cell 100 according to the present invention is shown in FIG. 10. The illustrated fuel cell 100 includes an anode (or anode material or anode electrode) 102 in contact with an anode support 106, a cathode (or cathode material or cathode electrode) 104 in contact with a cathode support 108 and a cation exchange membrane 110 disposed between the anode 102 and the cathode 104. In this embodiment, the fuel cell has a two chamber configuration, including an anode compartment (or chamber) 112 defined in part by an anode support 106 and a cathode compartment (or chamber) 114 defined in part by a cathode support 108. Support gaskets 116 are disposed between the walls and the anode and cathode. Channels 118, 120 passage through the chamber support to and from the chambers. Other components of the MFC include electrical plug 122, resistor 124, electrical post 126, auxiliary port 128, and wire mesh 130. Further, the dimensions elements shown in the drawings may be exaggerated to more clearly show details. As such, the drawings and description are to be regarded as illustrative in nature and not restrictive.

Figure 11:
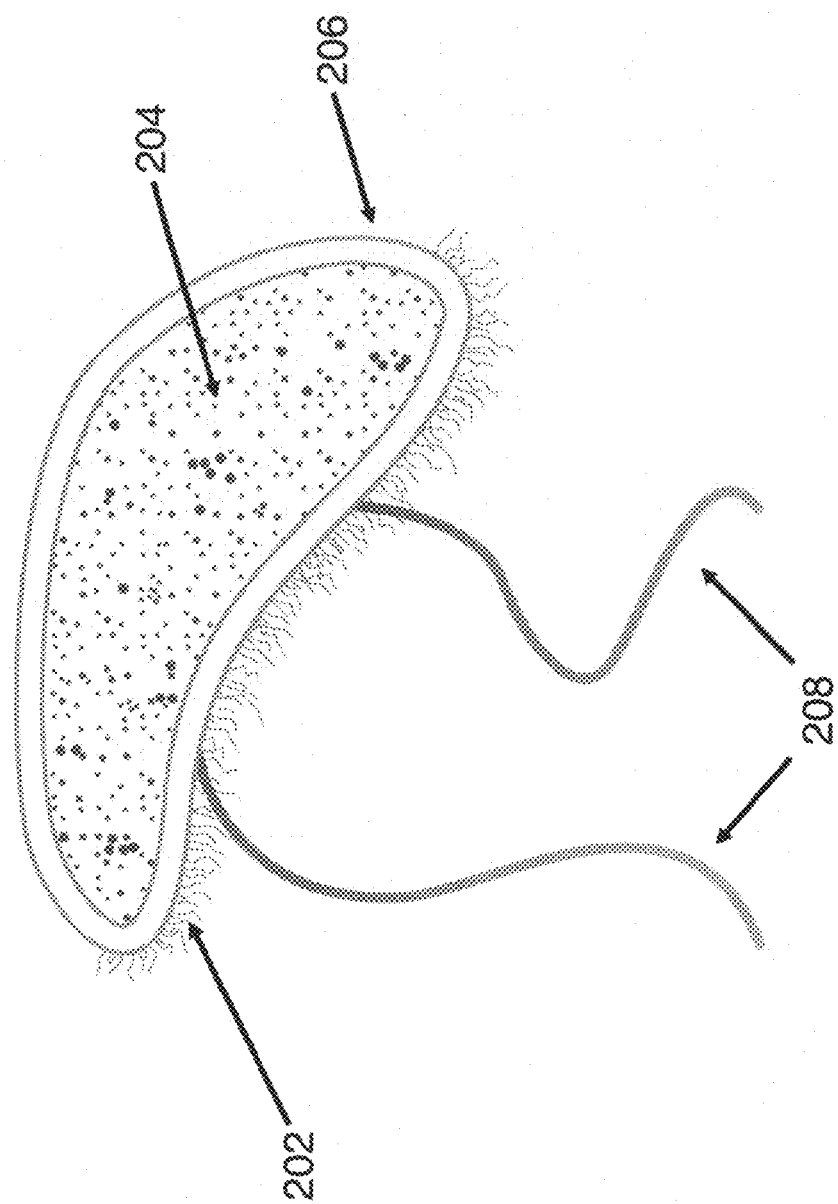
FIG. 11 shows a diagram of a partial anatomy of a bacterium in the family Geobacteraceae.

Various microbes can be used as electrogenic microbes with embodiments of the present invention. Microbes from the Geobacteraceae family are exemplary embodiments. A partial anatomy of a *Geobacter* cell is seen in FIG. 11 exhibiting the pili 202, cytoplasm 204, cell wall 206, and flagella 208.

An embodiment of the inventive composition and method is illustrated in the following example. The example is provided for illustrative purposes and is not considered a limitation on the scope of the inventive apparatus and methods.

Example 1

Prototypes of embodiments of this invention have been constructed and tested. The fuel cell apparatus shown in FIG. 10 is one embodiment.

The microbial fuel cells were set up using the following procedure.

Electrogenic Microorganisms:

*Geobacter sulfurreducens* was grown in anaerobic acetate-fumarate (NBAF) medium (Coppi, M. V., Lean, C., Sandler, S. J., and Lovley, D. R. (2001) Appl. Environ. Microbiol. 67:3180-3187) containing 10 millimolar (mM) acetate as the electron donor and 40 mM fumarate as the electron acceptor. Mixed colonies was obtained as anaerobic digester sludge from the Tapia Wastewater Treatment Facility (Malibu, Calif.) and used as received within two days.

MFC Assembly:

The flow-through cell illustrated in FIG. 10 and used in these experiments was constructed from two pieces (7×7×1.1 cm) of machined acrylic glass, one having the anode compartment 112 with dimensions (1.9×1.9×0.8 cm) and the other the cathode compartment 114 with dimensions (3.2×3.2×0.8 cm). Two pieces of butyl rubber, each with a one inch square opening in the middle, served as the gaskets 116. A piece of exchange membrane (e.g., Nafion 117) was placed between the rubber gaskets 116 as the cation exchange membrane 110, which electrically separated the anode and cathode compartments 112 and 114 while permitting proton transport.

The anode (or anode material or anode electrode) was composed of one of three materials: graphite cloth (0.3 mm thick GC-14, Electrolytica, Amherst, N.Y.), RVC foam (20 ppi density, 3% density, ERG Materials and Aerospace Corp.), or carbon microtruss (HRL Laboratories, Malibu, Calif.) 102. The dimensions of the electrode material equaled those of the anode compartment (in two dimensions for the graphite cloth and in three dimensions for the carbon foam and microtruss). In all cases, a 3.0×3.0 cm piece of graphite cloth served as the cathode 104. Connections to the anode 102 and the cathode 104 were made with Pt (platinum) wire woven through the graphite cloth, or with Pt mesh epoxied to or pressed against the carbon foam and microtruss samples. This method provided good electrical contact and did not impact the cell resistance. It is an unexpected finding of the present invention that the resistance of the carbon microtruss anode 102 is less than anodes made of graphite cloth or RVC foam. The microbial fuel cell with the carbon micro-truss anode 102 has a resistance of less than about 25 Ohms; generally the resistance is less than about 15 Ohms. In contrast, the microbial fuel cell with the reticulated vitreous carbon foam anode has a resistance of about 25 Ohms.

All materials were sterilized prior to use (autoclave, bleach, or ethanol treatment), and the cell components were assembled under sterile water. Each cell was held together by four screws, one placed at each corner of the cell.

MFCs powered by *G. sulfurreducens* were inoculated with 20 mL of *G. sulfurreducens* culture. MFCs powered by mixed colonies were inoculated with 20 mL of Tapia anaerobic digester sludge. In both cases the inoculum was added anaerobically to 200 mL of media that was continuously circulated through the anode chamber at a flow rate of 10-15 mL $min^{-1}$.

The anode and cathode compartments were electrically connected across a 160 Ohm resistor.

Anolyte (media) and catholyte contained in 250 mL bottles was continuously circulated through the anode and cathode compartments at a rate of 10-15 mL $min^{-1}$ using a peristaltic pump. The anolyte consisted of anaerobic freshwater media (see recipe below) with 10 mM acetate as the electron donor, constantly purged with an 80/20 mixture of $N_2/CO_2$. A solution of 50 mM potassium ferricyanide in TRIS buffer (see recipe below) served as the electron acceptor. The catholyte was left open to air. Solutions were changed as required when indicated by an increase in the optical density of the fresh water media solution, reduction of Fe3+ to Fe2+, or a loss in cell voltage and/or current output.

Freshwater Media:
Combine components: 800 mL NANOpure water, 2.5 g $NaHCO_3$, 0.25 g $NHCl_4$, 0.06 g $NaH_2PO_4.H_2O$, 0.1 g KCl, 10 mL vitamin mix (see recipe below), and 10 mL mineral mix (see recipe below). Add more NANOpure water to bring to final 1 L volume and mix well. Sterilize for not less than 20 min at minimally 100° C. Degas with 80/20 $N_2/CO_2$; after degassing, pH should be 6.8-7.0.

Vitamin Mix:
Combine components: 800 mL NANOpure water, 0.002 g biotin, 0.005 g pathothenic acid, 0.0001 g B-12, 0.005 p-aminobenzoic acid, 0.005 g thiotic (lipoic) acid, 0.005 g nicotinic acid, 0.005 g thiamine, 0.005 g riboflavin, 0.01 g pyridoxine HCl, and 0.002 g folic acid. Add more NANOpure water to bring to final 1 L volume and mix well.

Mineral Mix:
Combine components: 800 mL NANOpure water, 1.5 g NTA trisodium salt, 3.0 g $MgSO_4$, 0.5 g $MnSO_4.H_2O$, and 1.0 g NaCl, 0.1 g $FeSO_4.7H_2O$, 0.1 g $CaCl_2.H_2O$, 0.1 g $CoCl_2.6H_2O$, 0.13 g $ZnCl_2$, 0.01 g $CuSO_4.5H_2O$, 0.01 g $AlK(SO_4).12H_2O$, 0.01 g $H_3BO_3$, 0.025 g $NaMoO_4.2H_2O$, 0.025 g $NiCl_2.6H_2O$, and 0.025 g $Na_2WO_4.2H_2O$. Add more NANOpure water to bring to final 1 L volume and mix well.

TRIS Buffer:
Combine components: 800 mL NANOpure water, 3.64 g Trizma, 0.25 g $NH_4Cl$, 0.6 g $NaH_2PO_4.H_2O$, and 0.1 g KCl. Add more nanopure water to bring to final 1 L volume and mix well.

Characterization:
Fuel cell voltages were periodically monitored with a high impedance multimeter. Current voltage curves were generated using a Solatron SI 1287 potentiostat.

Results:
Referring to FIG. 12, the data summarize the performance of six MFCs that contained either carbon cloth, carbon foam, or carbon microtruss anode electrodes, and were inoculated with either pure *G. sulfurreducens* or mixed wastewater colony. These MFCs were identical in all other respects. The highest peak power was observed in the carbon microtruss-containing cells: 0.22 mW with *G. sulfurreducens* and 0.84 mW with the mixed culture. In addition, the "time to peak power," the time that elapsed between inoculating the MFC with bacteria and when peak power was attained, was shortest for the carbon microtruss anode and *G. sulfurreducens* combination, which required only 19 days to reach 0.22 mW, while the MFC with carbon cloth and *G. sulfurreducens* required 54 days to reach 0.20 mW. Similarly, the MFC with carbon microtruss anode and mixed wastewater culture required only 93 days to reach 0.84 mW, but the MFC with carbon cloth and mixed culture required 200 days to reach 0.80 mW. These times reflect the overall health and viability of the bacterial biofilms.

Figure 13A:
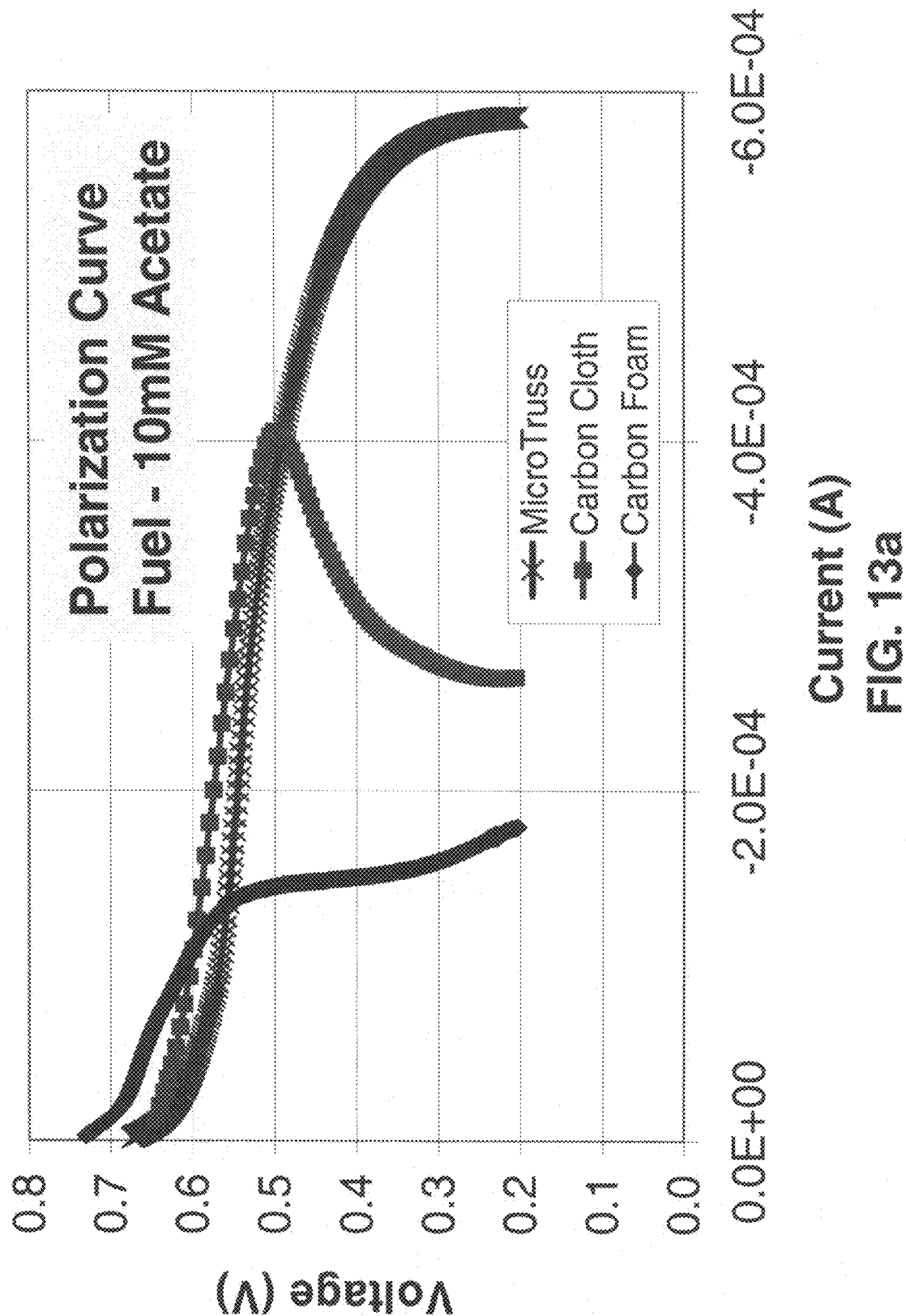
FIGS. 13a and 13b show graphs comparing carbon cloth, foam, and carbon microtruss materials with respect to current production (polarization curve) and material resistance (impedance plot), respectively.
Figure 13B:
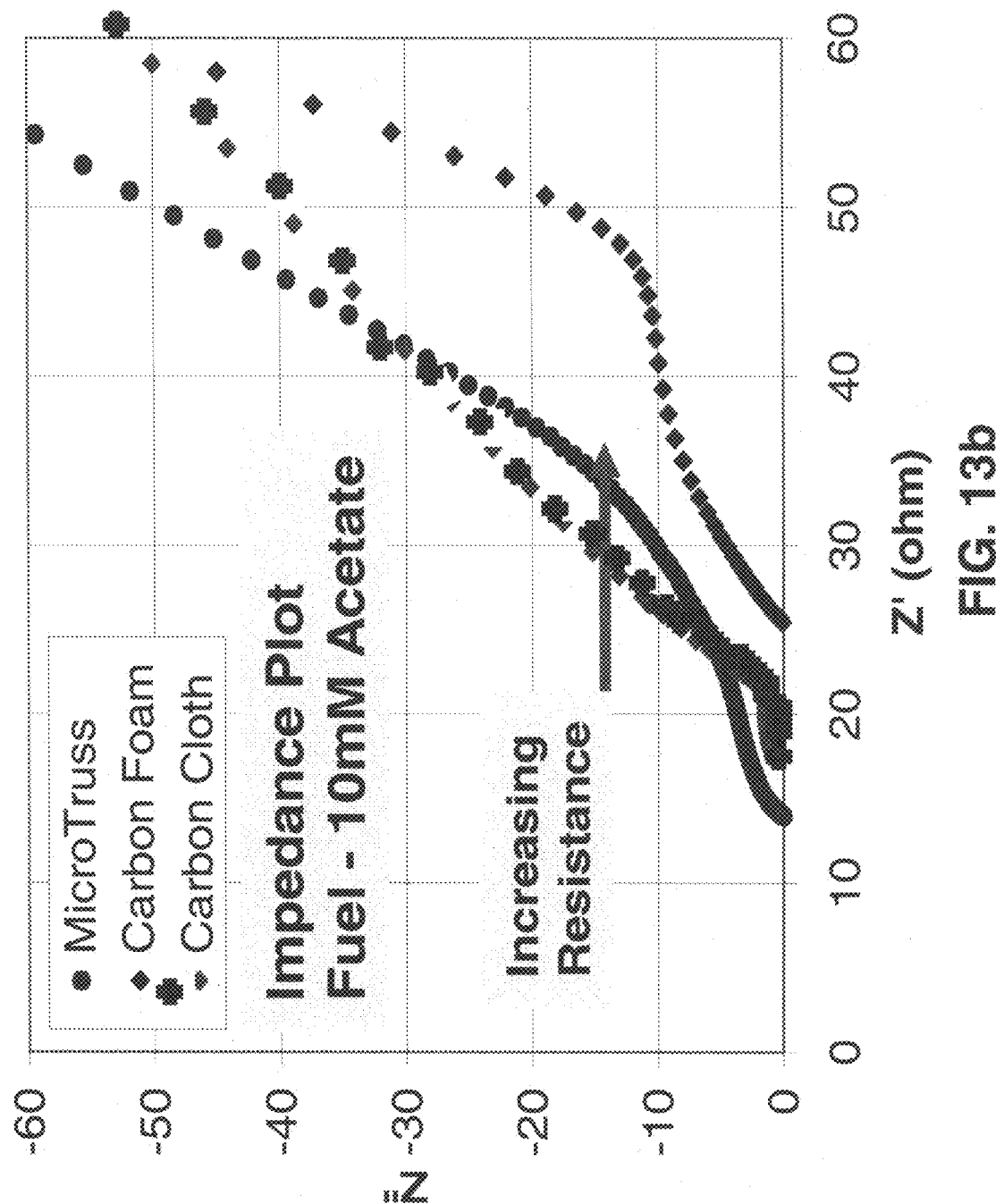

Current production from MFCs containing the three different anode electrode materials was evaluated. As illustrated in FIGS. 13a and 13b, the power output of the microtruss-containing system was greater than that of the carbon cloth or carbon foam fuel cell after an equal incubation period. In FIG. 13a, the polarization curves also indicate that the microtruss has favorable mass transport properties, which is likely a result of the regular pore structure of the microtruss. Surprisingly, the power output does not appear to be limited by mass transport as it does in the carbon cloth and carbon foam systems. The carbon foam electrode has the poorest performance, which is likely due to the increased resistance of the material, which is further illustrated in the impedance plot in FIG. 13b.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. An anode material in a microbial fuel cell having an electrode compartment, wherein the anode material comprises a microbial biofilm grown on a three-dimensional ordered open-cellular microstructure; wherein the three-dimensional ordered open-cellular microstructure comprises: a plurality of first truss elements defined by a plurality of first self-propagating polymer waveguides and extending along a first direction; a plurality of second truss elements defined by a plurality of second self-propagating polymer waveguides and extending along a second direction; and a plurality of third truss elements defined by a plurality of third self-propagating polymer waveguides and extending along a third direction, wherein the first, second, and third ordered truss elements interpenetrate each other at a plurality of nodes to form a continuous material.

2. The anode material of claim 1, wherein the anode material fills the entire electrode compartment.

3. The anode material of claim 1, wherein the three-dimensional ordered open-cellular microstructure is an electron-conducting microstructure.

4. The anode material of claim 3, wherein the three-dimensional ordered open-cellular microstructure is a three-dimensional ordered open-cellular carbon microstructure.

5. The anode material of claim 1, wherein the three-dimensional ordered open-cellular microstructure has a dimension that allows for growth of the microbial biofilm to its natural thickness; and wherein the three-dimensional ordered open-cellular microstructure permits fluid flow within its internal space.

6. The anode material of claim 1, wherein the three-dimensional ordered open-cellular microstructure has a electrical resistance less than about 25 Ohms.

* * * * *